United States Patent [19]
Bichel

[11] Patent Number: 5,329,845
[45] Date of Patent: Jul. 19, 1994

[54] APPARATUS FOR WATERLESS HULLING OF NUTS AND THE LIKE

[76] Inventor: Ronald A. Bichel, 1016 River Bend Dr., Hartford, Wis. 53027

[21] Appl. No.: 97,137

[22] Filed: Jul. 26, 1993

[51] Int. Cl.$^5$ ............................................. A23N 7/02
[52] U.S. Cl. ........................................ 99/627; 99/623; 99/625; 99/630
[58] Field of Search ................ 99/516, 536, 518, 487, 99/519, 623-626, 628-630; 15/3.19, 3.2; 134/132; 426/481-483

[56] References Cited

U.S. PATENT DOCUMENTS

| | | | |
|---|---|---|---|
| 3,134,413 | 5/1964 | Dorsa et al. | 99/627 |
| 3,437,116 | 4/1969 | Daugherty | 99/584 |
| 3,566,942 | 3/1971 | Smith | 99/625 |
| 3,602,280 | 8/1971 | Hill | 99/625 |
| 3,946,658 | 3/1976 | Smith | 99/623 |
| 4,132,162 | 1/1979 | Magnuson | 99/630 |
| 4,237,782 | 12/1980 | Bichel | 15/3.2 |
| 4,258,069 | 3/1981 | Amstad | 426/483 |
| 4,519,305 | 5/1985 | Vanosdall | 99/625 |
| 4,827,836 | 5/1989 | Neidigh | 99/625 |
| 5,106,641 | 4/1992 | Bichel | 99/516 |

*Primary Examiner*—Timothy F. Simone

[57] ABSTRACT

The apparatus comprises a cage (rotatable in one direction) formed by roller brushes (rotatable in the opposite direction) radially arranged about a axis to define a sloped chamber. A fender is located along one side of each roller brush. A stationary tube, closed at both ends and having a motor-driven rotatable auger therein, extends through the chamber. The tube has four openings (proceeding from the high to the low end of the chamber): a top (supply) opening; a bottom (feed) opening; a top (recovery) opening; and a bottom (discharge) opening. Unhulled nuts from the supply opening are fed through the feed opening by the auger and form a single layer against the chamber wall and advance through the sloped chamber. During cage and roller rotation, each nut is trapped between a fender and the bristles in the outgoing quadrant of the adjacent roller brush and the hull is removed. Fully-hulled nuts, when they reach the 3 o'clock to 1:30 o'clock position of the rotating cage, fall through the recovery opening into the tube and are expelled from the tube through the discharge opening by the auger.

21 Claims, 10 Drawing Sheets

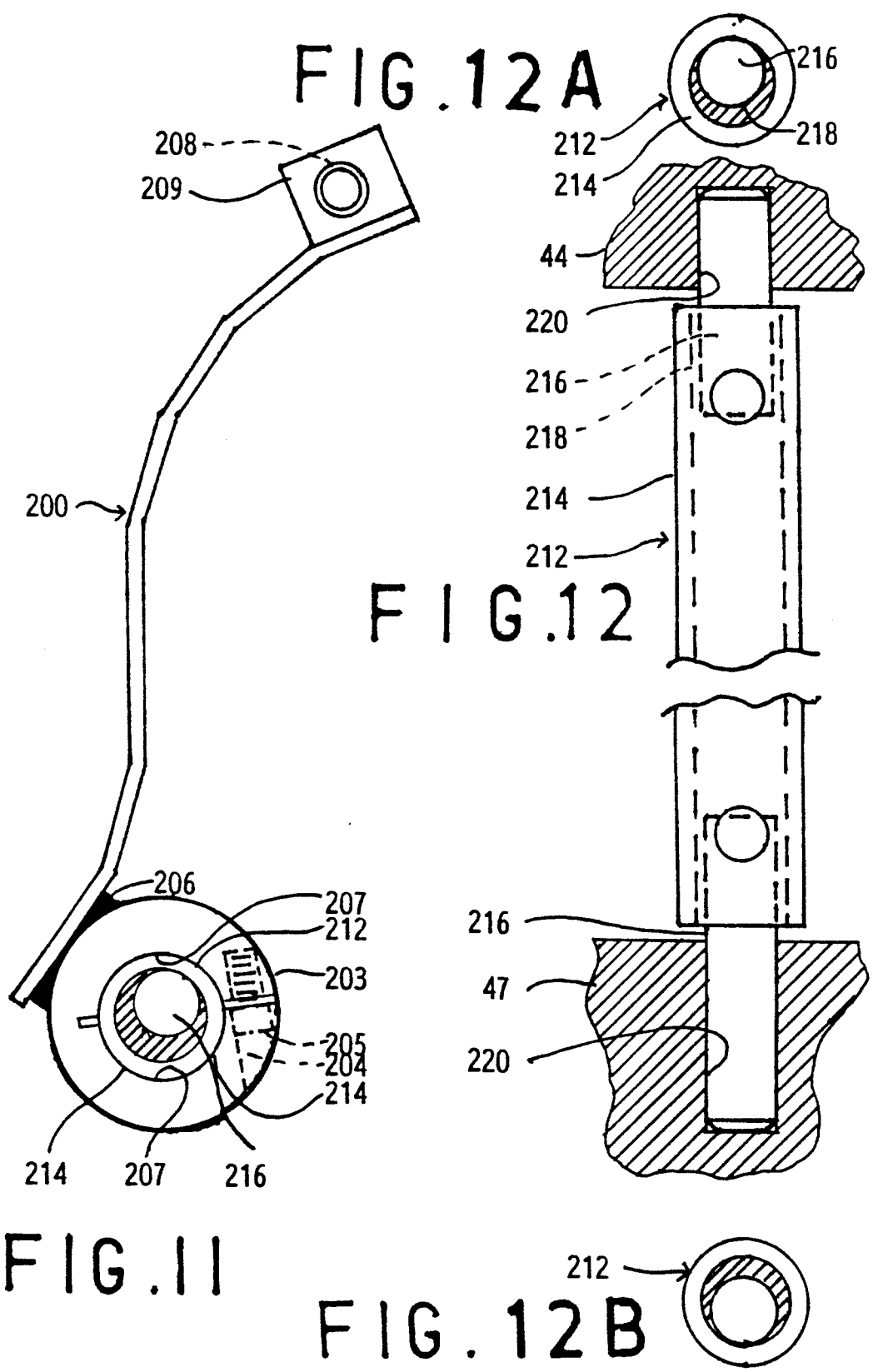

APPARATUS FOR WATERLESS HULLING OF NUTS AND THE LIKE

BACKGROUND OF THE INVENTION

1. Field of Use

This invention relates generally to apparatus for waterless hulling of small-diameter fruit and vegetable products such as nuts, corn kernels, grains and the like.

In particular, it relates to improved means for introducing and removing products from the apparatus and, furthermore, to improved means for controlling hull removal while in the apparatus.

2. Description of the Prior Art

Prior art apparatus for cleaning and peeling fruit and vegetable products, such as potatoes, carrots, and the like, typically employs rotatable roller brushes in various arrangements to abrade the outer layer of skin from the product. The following U.S. Pat. Nos. illustrate the state of the art: 4,258,069; 4,230,034; 3,811,000 and 2,355,810.

In some prior art arrangements a plurality of rotatable roller brushes are arranged in radially spaced-apart relationship about a horizontal main axis to define a rotatable roller cage having a product-receiving chamber therewithin. Typically, a rotatable auger or other means within the chamber is employed to do two things: first, advance the product axially therethrough and, two, force the product to engage the roller brushes so that the brushes can clean and peel the product. Furthermore, water is injected or sprayed into the chamber and onto the product to enable or facilitate the cleaning and peeling process.

However, the use of such augers or similar devices to force the product against the brushes substantially reduces the volumetric capacity of the chamber and limits the amount of product that can be processed at a given time. Furthermore, such forcing can inflict physical damage on the product being processed thereby causing waste and adding to the cost and complexity of the apparatus. The use of water during processing can adversely affect the texture and moisture content of the finished product, can cause a sludge-like mixture of peelings and dirt to accumulate within the chamber and on the product which adversely affects the quality of the finished product and which can, in some cases, actually interfere with and inhibit the cleaning/peeling process.

My U.S. Pat. No. 5,106,641 issued Apr. 21, 1992 entitled APPARATUS AND METHOD FOR WATERLESS ROTARY CLEANING AND PEELING FOOD PRODUCTS AND THE LIKE provides improved apparatus and method for using rotatable abrading rollers to clean and peel products, such as fruits, vegetables, nuts, kernels and the like, without the need for augers or the like to move and direct the product against the roller brushes and without the use of water during processing.

The improved apparatus in my U.S. Pat. No. 5,106,641 broadly comprises a plurality of rotatable roller brushes arranged to define a rotatable roller cage having a product-receiving chamber therewithin with a main axis which is sloped slightly downwardly from horizontal. Means are provided to rotate the roller cage in one direction and to rotate each roller brush in the opposite direction. Each roller brush comprises bristles around its circumference. Means are provided to feed the product into the high inlet end of the chamber and to impart rotational movement to the product as it is being fed into the chamber.

In accordance with my U.S. Pat. No. 5,106,641, the rotational speed of the roller cage, the rate at which product is fed into the chamber and the initial rotational speed of the product entering the chamber are regulated, taking into account the size, shape and weight of the product, so that substantially only one layer of product is disposed against the majority of roller brushes defining the wall of the chamber. As each piece of product nears the top of the chamber, assuming counterclockwise cage rotation, gravity causes the piece to disengage the rollers near the 1 o'clock position, travel across the top of the chamber, and reengage the rollers near the 11 o'clock position.

Each roller has abrasive means, such as bristles or abrasive material, around its entire circumference. At any given moment, half of the abrasive means confront the chamber. During roller rotation, the abrasive means confronting the chamber move arcuately through a first (incoming) quadrant toward the chamber and then through a second (outgoing) quadrant away from the chamber. Therefore, an unhulled nut deposited between adjacent rollers by centrifugal force is subjected to two opposing forces. More specifically, as the abrasive means in the outgoing quadrant of one roller tends to draw the nut into the space between the rollers, the abrasive means in the incoming quadrant of the other roller tends to push the nut out of the space between the rollers. Furthermore, some of the hull scraped therefrom is flung outwardly of the chamber (which is desirable) and some is flung inwardly (which is undesirable).

In operation, the pieces of product entering the chamber are flung against the chamber wall and are held thereagainst in a single layer by centrifugal force as the cage rotates, except in the region near the top of the chamber, as explained above. At the same time, the bristles of the rotating roller brushes clean and peel the product. As explained above, the bristles cause most peelings to be flung outwardly of the chamber, but some are flung inwardly. The slope of the chamber causes the product to advance toward and exit through the outlet opening at the low end of the chamber. The amount of centrifugal force employed to keep a layer of product against the roller brushes is kept at a minimum so, assuming that the cage rotates counterclockwise and that the highest point of cage rotation is at "12 o'clock", a piece of product can be raised to near the 1 o'clock position whereat it becomes airborne until it reaches the 11 o'clock position. The product pieces tumble and rotate as they are engaged by the bristles and this ensures that all of the outer surface of each piece of product is cleaned and peeled by the time it passes through the chamber.

The apparatus in my U.S. Pat. No. 5,106,641 is very well-suited for its intended purposes, but it is desirable to improve its efficiency.

SUMMARY OF THE PRESENT INVENTION

This invention relates generally to apparatus for waterless hulling of small-diameter fruit and vegetable products such as nuts, corn kernels, grains and the like.

In particular, it relates to improved means for introducing and for removing the products from the apparatus. It also relates to improved means for controlling hull removal while the product is in the apparatus of rollers defining the wall of the chamber.

Apparatus in accordance with the invention acomprises a plurality of rotatable rollers arranged in radially spaced-apart relationship about an axis so as to define a rotatable roller cage having a generally cylindrical, sloped, product-processing chamber having a high end and a low end. Abrading means are provided on the peripheral surface of each roller. That portion of the abrading means confronting the chamber as a roller rotates moves arcuately through a first quadrant toward the axis of the chamber and then through a second quadrant away from the axis of the chamber. Means are provided to rotate the roller cage about its axis in one direction and to rotate each roller in a direction opposite to the one direction. Rotational speed of the cage takes into account the size and weight of the product and the rate at which the products are fed into the chamber. This is done to effect distribution of substantially a single layer of product along the rollers, to effect advancement of the products from the high end toward the low end of the chamber, and to effect removal of the outer covering of the products in contact with the abrading means of the rollers. Guard means are provided in the chamber and are associated with the rollers to enable products to make contact with only that portion of the abrading means moving arcuately through the second quadrant. Means are provided to introduce the products into the chamber near the high end for processing. Container means are located in the chamber and have a product-recovery opening in the top thereof near the low end of the chamber to receive products from which the outer covering has been removed and which are falling toward the bottom of the chamber. Means are provided to expel the products from which the outer covering has been removed from the container exteriorly of the chamber.

The container means comprises a tube and the means to expel the product comprises rotatable auger means in the tube. The tube extends through and projects from opposite ends of the chamber and, in addition to the product recovery opening, further comprises a supply opening exteriorly of the chamber through which products are supplied to the tube, a feed opening through which products are introduced into the chamber, and a discharge opening exteriorly of the chamber through which products are expelled from the tube.

The cage, when yielded from one end, is perceived as rotating counterclockwise and each roller is perceived as rotating clockwise. The hulled nuts tend to fall downwardly when reaching the sector approximately between the 3 o'clock and 1:30 o'clock positions. The product-recovery opening in the container is aimed to receive the falling nuts. The container is provided with a collection pan member extending outwardly along the lower edge of the product-recovery opening to catch and direct falling hulled nuts into the product-recovery opening. The container is further provided with a deflection member extending outwardly along the upper edge of the product-recovery opening to prevent unhulled nuts falling from above the 1:30 o'clock position into the product recovery opening. The deflection member is adjustably positionable relative to the collection pan.

The guard means comprises a plurality of fenders, each fender being disposed adjacent that portion of the abrading means on an associated roller which is moving arcuately through the first quadrant. As a result, during operation of the apparatus, the products are able to make contact only with that portion of the abrading means on the associated roller which is moving arcuately through the second quadrant. Each piece of product is forced by the abrading means of one roller moving arcuately through the second quadrant against a fender disposed adjacent another roller. Means are provided to adjust the position of the fender relative to the abrading means in the second quadrant of the one roller to control the force exerted by the abrading means on a piece of product entrapped between the fender and the one roller.

In operation, unhulled nuts are supplied from a source to the supply opening of the tube and are fed by the auger means through the product feed opening into the chamber. Counter-clockwise rotation of the roller cage causes a layer of nuts to be distributed around the wall of the chamber for hulling by the rollers and to advance toward the low end of the sloped chamber. However, as the nuts are raised by counterclockwise drum rotation (see FIG. 5), gravity causes them to be released from engagement with the rollers. More specifically, unhulled nuts tend to disengage when they near the 1 o'clock position of the rotating drum and then fall or are flung into engagement with other rollers near the 11 o'clock position. Hulled nuts, however, tend to disengage sooner (typically between the 3 o'clock and 1:30 o'clock position, as herein after explained) and this is where they can be caught, as hereinafter explained. During operation, each engaged nut is trapped between a fender and the outgoing quadrant of a roller and is efficiently hulled and its waste hull is flung outwardly of the chamber. As previously explained, the hulled nuts, under the force of gravity, fall from the rollers at a point lower in orbit than unhulled nuts (i.e., approximately in the 3 o'clock to 1:30 o'clock sector of the orbit). Since the product recovery opening in the tube (and its associated pan and door) are located in this sector, the hulled nuts fall therethrough back into the tube for transport by the auger to the discharge opening of the tube. Unhulled nuts continue to be processed until they are hulled and fall into the recovery opening.

The present invention provides several important advantages over the prior art. For example, the absence of water enables the apparatus to process a product which takes the form of relatively small pieces, such as kernel corn, nuts and the like. Relatively small-diameter products, can be efficiently hulled or peeled without the use of water, thereby producing a superior finished product and eliminating the need to clean and dry the finished product before further processing is carried out. The fenders result in more effective hulling and more efficient handling of waste. The fenders are adjustably positionable to accommodate nuts of various sizes and to regulate the abrasive force exerted on the nut hull, thereby avoiding excessive waste. The tube and auger within the chamber do not force the product against the rollers, thereby eliminating product damage. Nuts are very quickly hulled after entering the chamber and those which are hulled are quickly expelled from the apparatus so as not to interfere with unhulled nut still being processed. Since no nut may exit the chamber except by means of the auger, and since no nut tends to fall into the product outlet opening until it has been processed and efficiently captured by the collection pan and adjustable door, the finished product contains few, if any, unhulled nuts, thereby reducing labor costs. The tube and auger therewithin occupy little chamber space and do not substantially reduce the capacity of the apparatus. Since the apparatus operates without water (except for flushing and cleaning when processing is completed), the apparatus can be trailer-mounted and tractor-powered and taken into an orchard remote from a water supply to accomplish hulling at the tree and leaving the hull waste in the field. Reduction of water use and return of hull waste to the orchard are ecologically desirable.

Apparatus in accordance with the present invention is especially well-adapted to process products such as pistachio nuts, each of which, when removed from the tree as by shaking the tree with a mechanical device, is about ¾ of an inch in over-all diameter and comprises the nut meat, a hard shell surrounding the nut meat, and a semi-soft fibrous hull about ⅛ of an inch thick surrounding the shell. The present invention removes the hull from the shell and the shell is removed elsewhere by other means not part of the present invention.

However, the present invention is not limited to processing pistachio nuts and can process other products having a removable outer hull, membrane, skin or the like (such as the red skin on shelled almonds).

It should be noted that the improved means for controlling hull removal can be used with the apparatus disclosed in my U.S. Pat. No. 5,106,641, as well as with the apparatus disclosed herein which comprises improved means for introducing unhulled nuts into the chamber for processing and for removing the hulled nuts from the chamber after processing.

Other objects and advantages of the invention will hereinafter appear.

DESCRIPTION OF THE DRAWINGS

FIG. 11 is an enlarged end view of a fender shown in FIGS. 5 and 6;

FIG. 12 is a top plan view of a fender support for the fender shown in FIG. 11;

FIGS. 12A and 12B are end views of the fender support shown in FIG. 12;

DESCRIPTION OF PREFERRED EMBODIMENTS

General Arrangement

Figure 1:
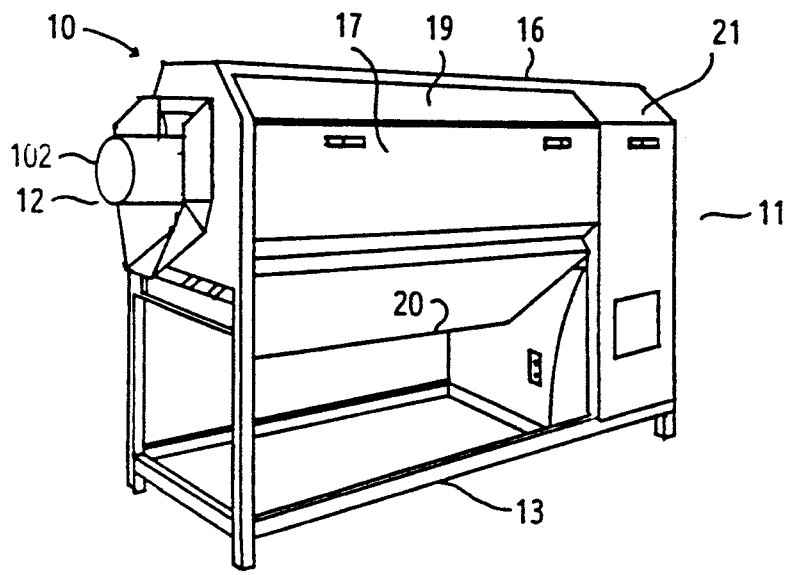
FIG. 1 is a perspective view taken from the outlet end of apparatus in accordance with the invention.
Figure 4:
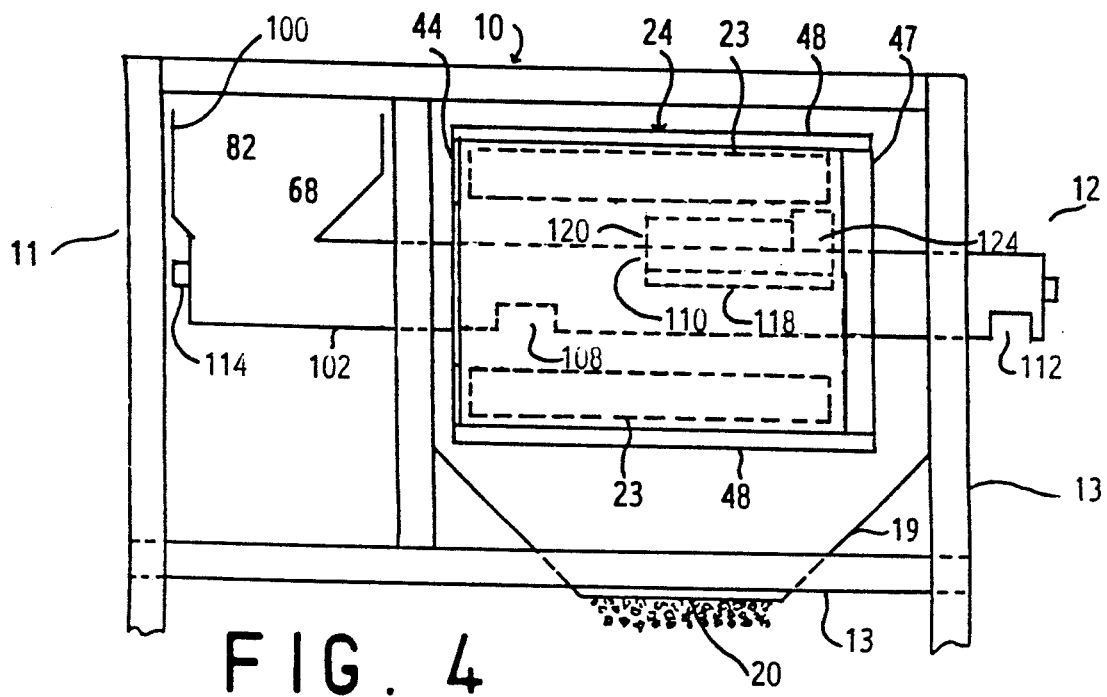
FIG. 4 is an enlarged schematic side elevation view of the apparatus of FIG. 1.
Figure 5:
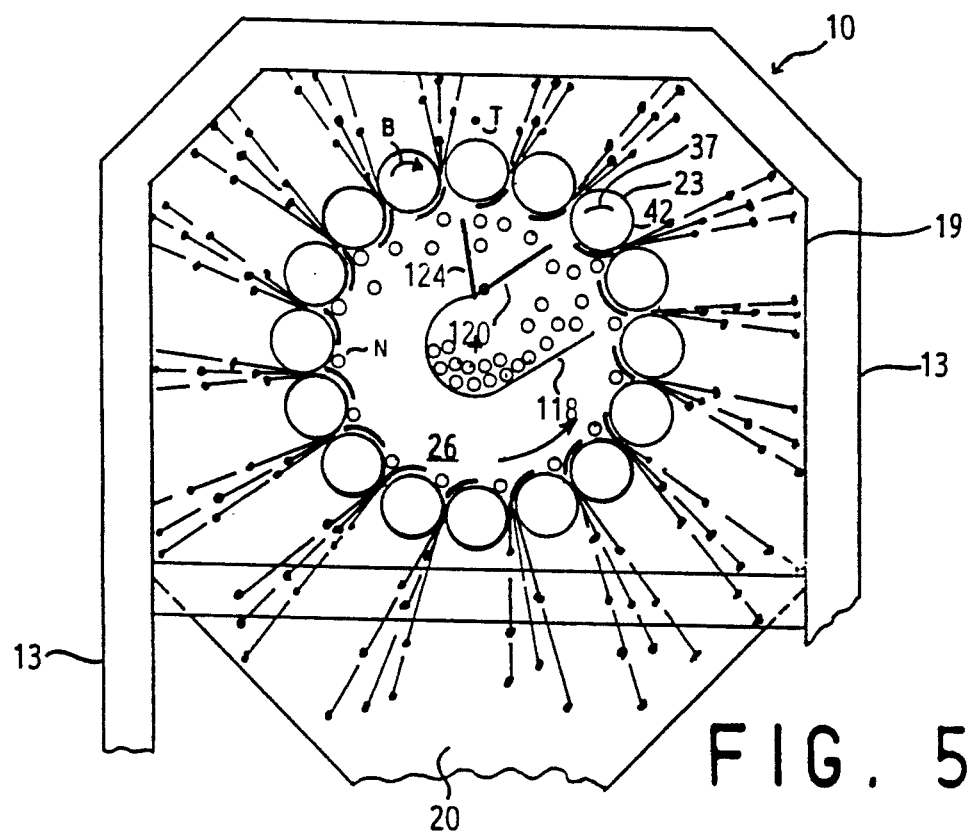
FIG. 5 is an enlarged schematic end elevation view of the apparatus of FIG. 1.

Referring to FIGS. 1, 4 and 5, the apparatus 10, which has an inlet end 11 and an outlet end 12, comprises a support frame 13, a stationary housing 16, including a roller cage housing 19 and a drive housing 21, and a rotatable roller cage 24. Housing 19 has an access door 17 on one side and a waste exit opening 20 at the bottom. As FIGS. 4, 5, 7 and 11 show, housing 19 encloses a roller cage 24 which comprises a plurality of abrading rollers in the form of roller brushes 23 which are radially arranged to define a chamber 26 therewithin in which the product, in the form of pistachio nuts, is processed. Cage 24 and chamber 26 have a main axis 29 which slopes slightly downwardly from horizontal (about 3° in FIGS. 7 and 10) from inlet end 11 to outlet end 12.

Figure 6:
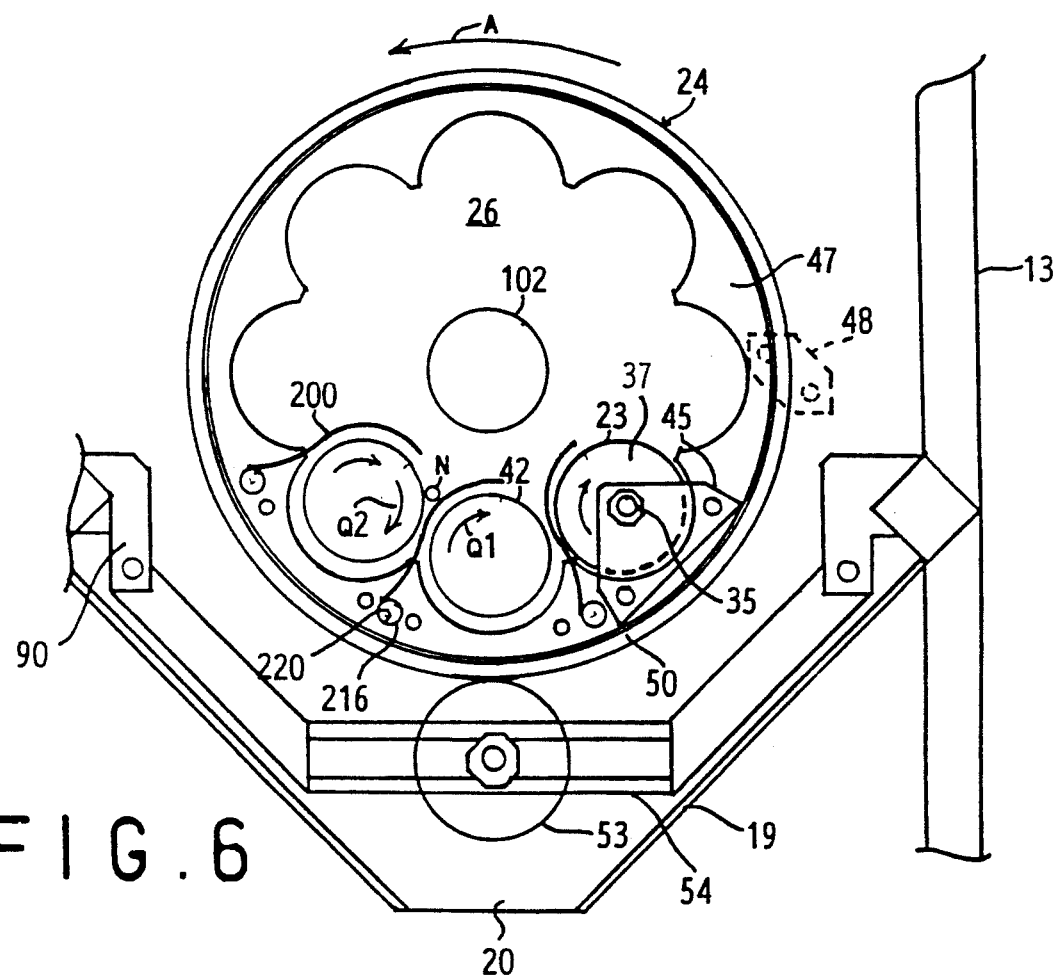
FIG. 6 is an enlarged end view of the roller and fender support assembly at the outlet end of the apparatus.

Referring to FIG. 6, each brush 23 comprises a roller axle 35 with a roller axis extending longitudinally therethrough, a roller core 37 affixed to axle 35, and a plurality of bristles 42 affixed around and along the circumference of core 37. For certain products, roller 23 may be provided with other abrasive means, such as a roughened surface (not shown), instead of bristles.

The number of roller brushes 23 in any specific machine can be varied to suit the nature of the product to be processed. FIGS. 2, 3, 6 and 9 depict eight brushes 23, whereas FIG. 5 depicts sixteen brushes 23, for example, which are well-suited to process small-diameter products such as nuts.

As FIG. 6 shows, each roller brush 23 has bristles 42 (or other abrading means) around its entire circumference. At any given moment, half of the bristles confront chamber 26. During roller rotation, the bristles 42 confronting chamber 26 move in an arcuate path through a first or incoming quadrant Q1 toward the axis of chamber 26 and then through a second or outgoing quadrant Q2 away from the axis of the chamber 26.

Figure 7:
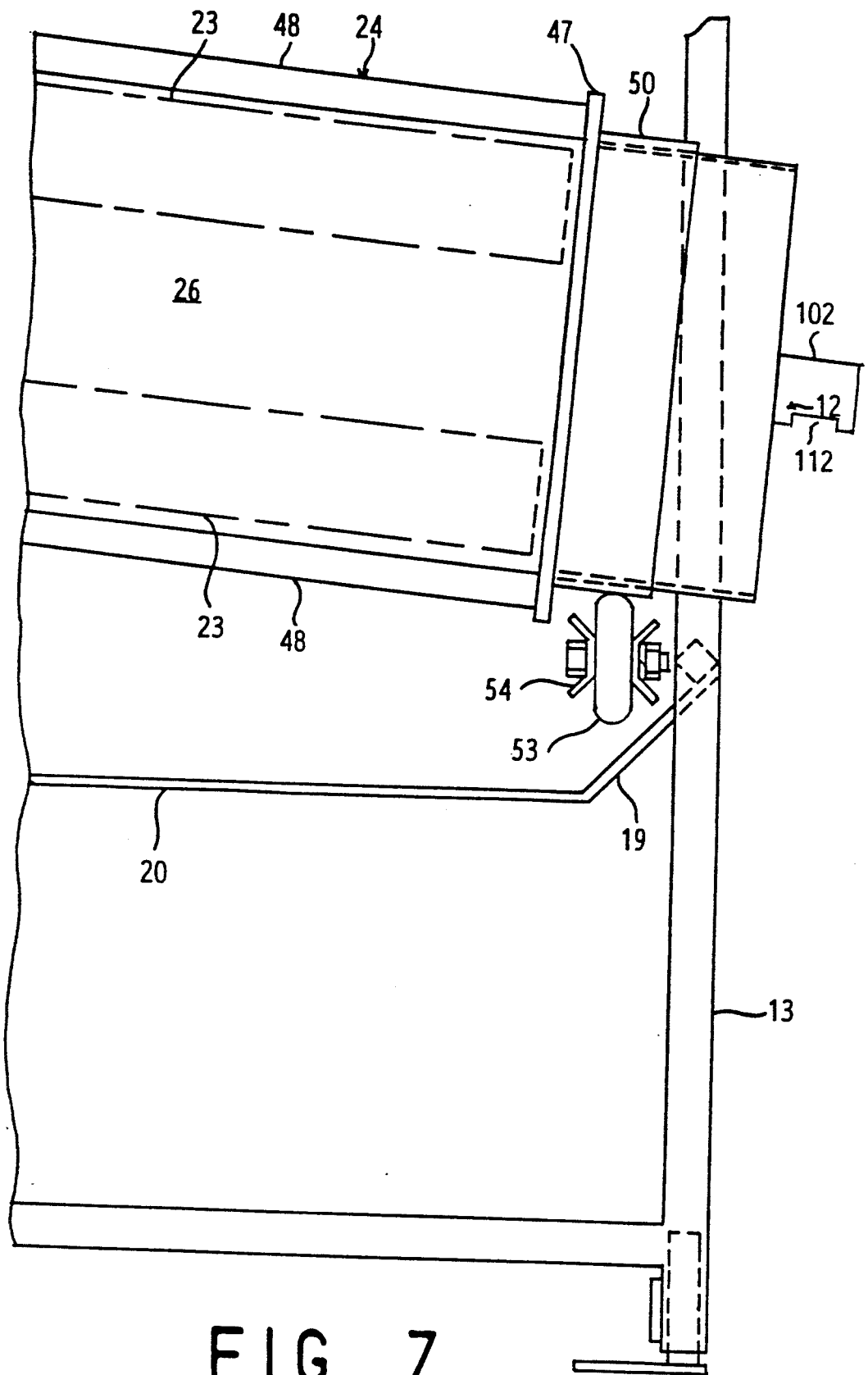
FIG. 7 is an enlarged side elevation view of the roller cage support assembly at the outlet end of the apparatus shown in FIG. 6.
Figure 8:
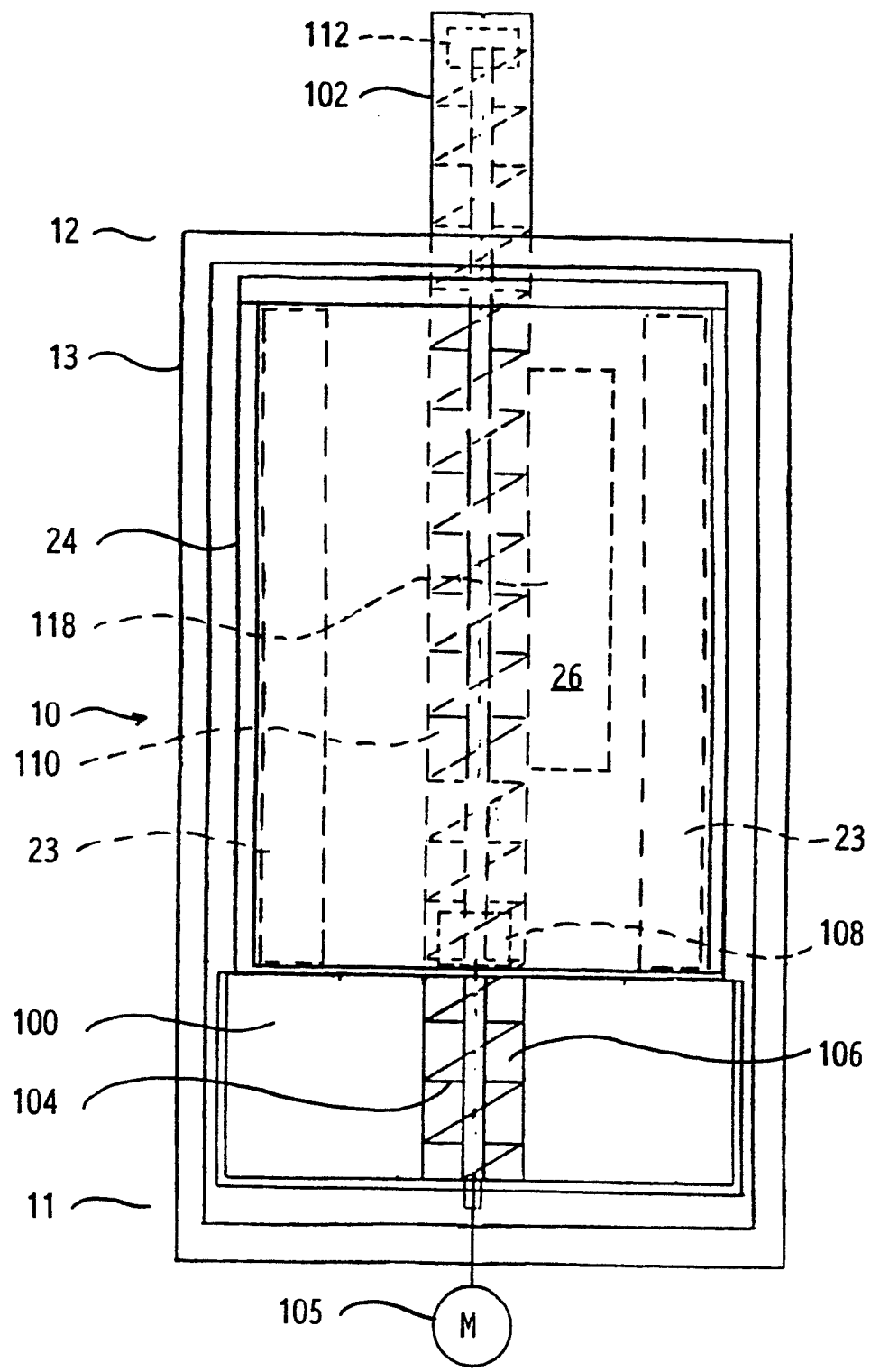
FIG. 8 is a schematic top plan view of the apparatus of FIG. 1.
Figure 10:
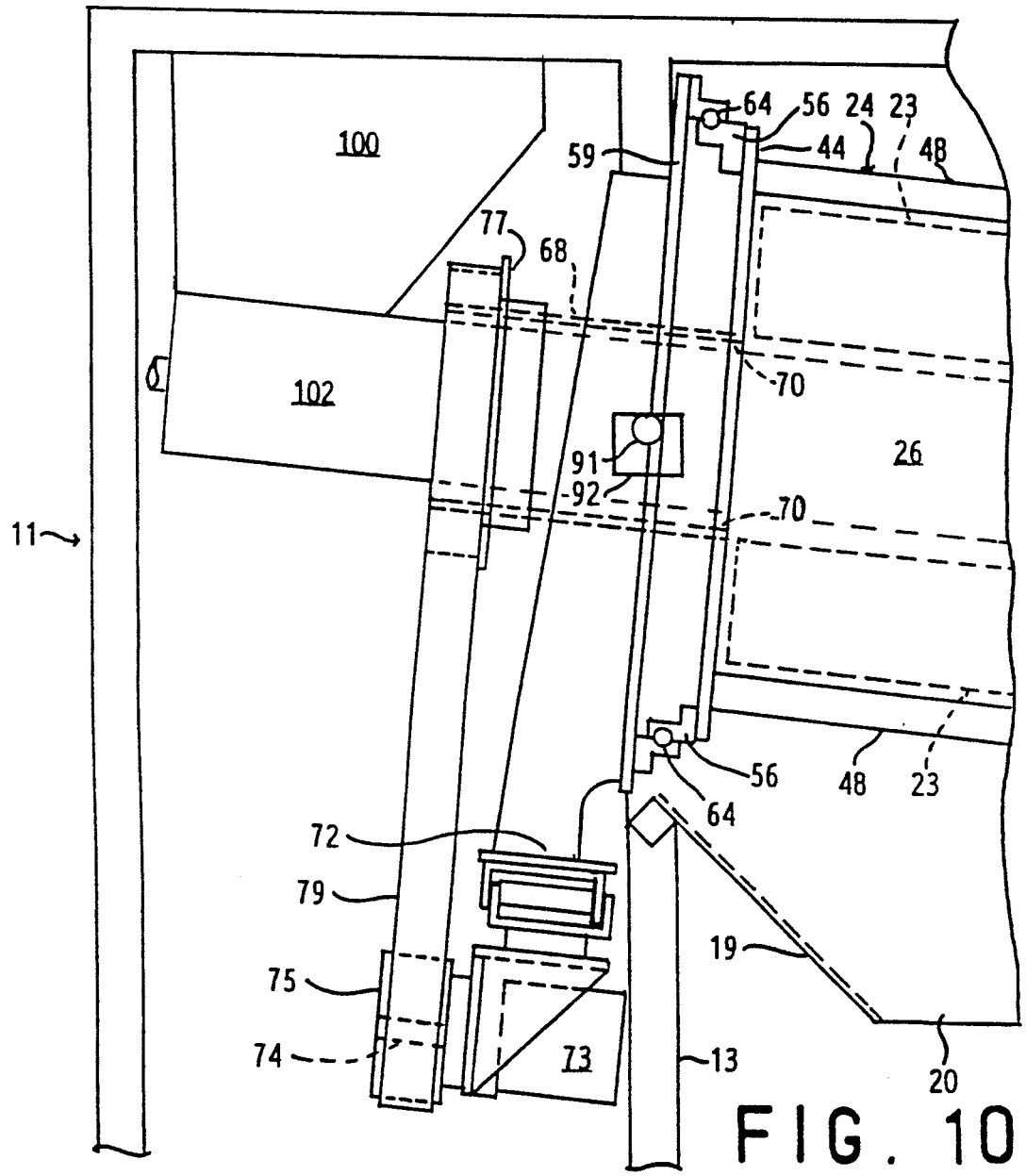
FIG. 10 is a side elevation view of the apparatus shown in FIG. 9.

Referring to FIGS. 4, 7 and 10, cage 24 comprises a brush support ring 44 at inlet end 11 and a brush support ring 47 at outlet end 12 which are fixedly connected together in spaced-apart relationship by four rigid support rods 48 (see FIGS. 4, 7 and 10). Brush cage 24 is rotatably supported on a ring gear 59 and on a support roller 53, both of which are ultimately supported on support frame 13.

Referring to FIGS. 4, 6, 7 and 10, the brushes 23 are rotatably supported by brackets 45 (see FIG. 6) attached to rotatable brush support rings 44 and 47. As FIGS. 6 and 7 show, brush support ring 47 has an annular flange 50 affixed thereto which rides on a support roller 53 which is rotatably mounted on an adjustable bracket 54 on the support frame 13. As FIG. 10 shows, brush support ring 44 has a annular flange 56 affixed thereto which rides on ball bearings 64 located between brush support ring 44 and stationary ring gear 59 located at inlet end 11 and non-rotatably (but tiltably) secured to the support frame 13. As FIGS. 2 and 3 show, each brush axle 35 has a pinion gear 65 fixedly mounted thereon at inlet end 11 and pinion gear 65 meshes with the internal teeth of ring gear 59.

Figure 2:
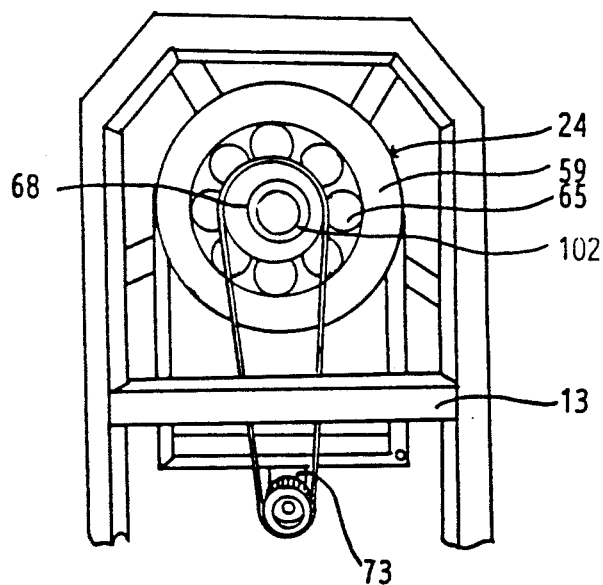
FIG. 2 is an enlarged perspective view of the roller cage/roller drive assembly at the inlet end of the apparatus, with a portion of the housing removed to reveal interior details.
Figure 3:
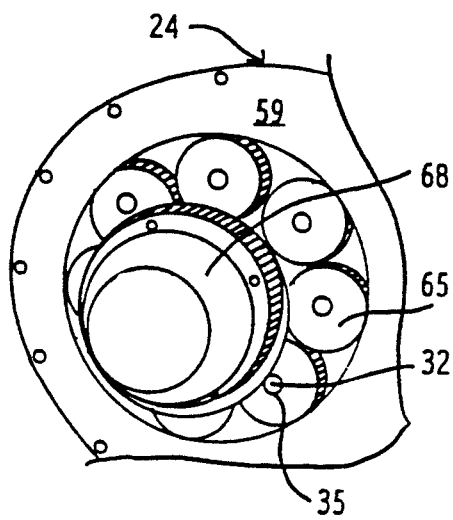
FIG. 3 is an enlarged perspective view of the drive assembly of FIG. 2.
Figure 9:
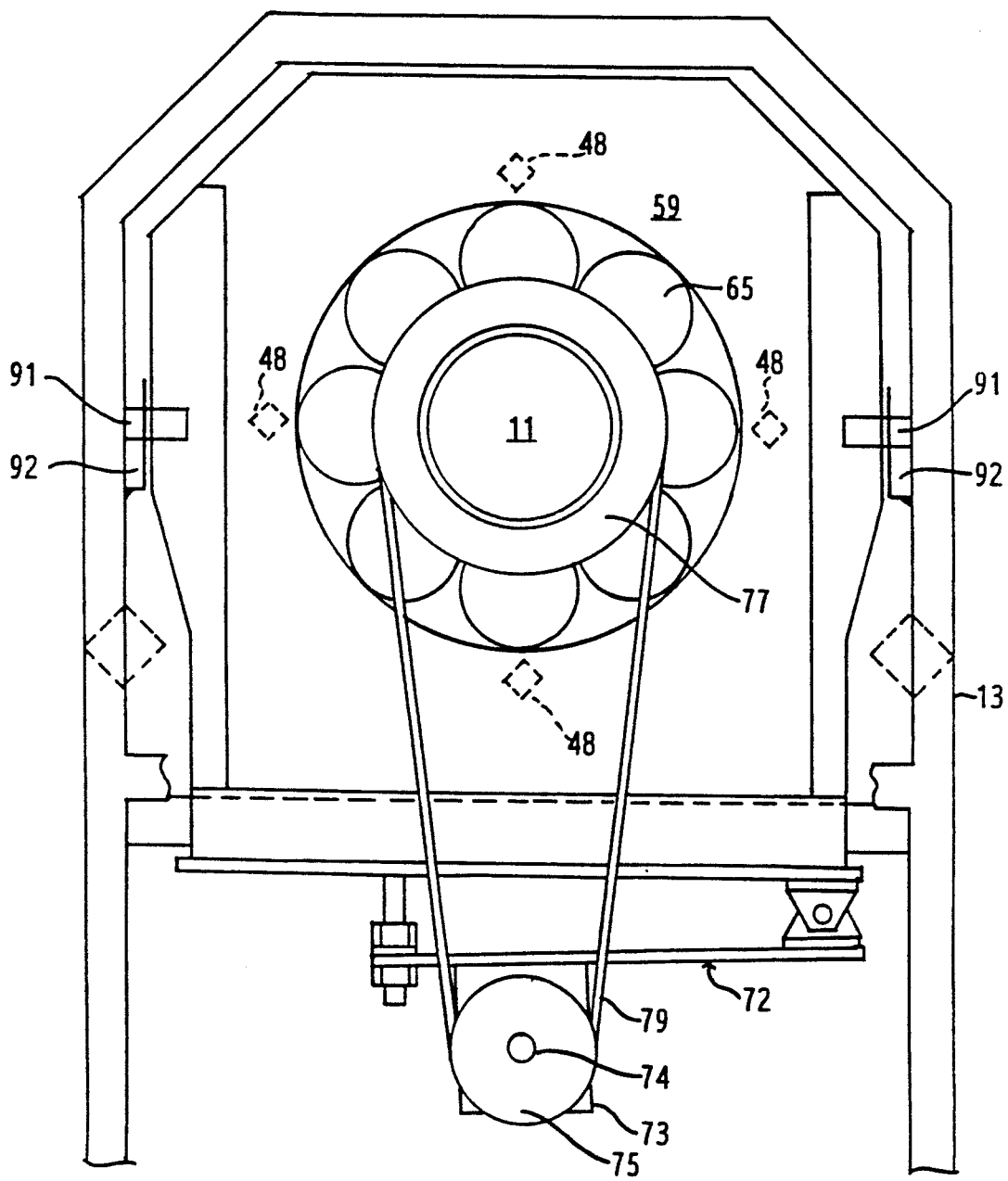
FIG. 9 is an enlarged end view, similar to FIG. 2, of the inlet end of the apparatus.

As FIGS. 2, 9 and 10 show, a drive motor 73 (electric or hydraulic) is mounted within drive housing 21 on a bracket assembly 72 connected to tiltable stationary ring gear 59 and has a motor drive shaft 74 with a motor drive pulley 75 thereon. As FIG. 9 makes clear, bracket assembly 72 allows motor 73 to be adjustably positioned to tighten a belt 79. The endless flexible drive belt 79 is connected between motor drive pulley 75 and a driven pulley 77 rigidly affixed to a power transmission tube 68. Tube 68 is welded to brush support ring 44. Thus, motor 73 operates to effect rotation of roller cage 24 and rotation of the latter effects rotation of the roller brushes 23 through ring gear 59 and the pinion gears 65.

Since chamber 26 slopes downward from horizontal (3° being shown in the drawings), the product proceeds from the inlet end 11 to the outlet end 12 as the brush cage 24 rotates. The greater the degree of slope, the greater the speed of advance. Provision is made to change the degree of slope. Thus, means including an adjustable bracket 90 (FIG. 6) are provided to raise or lower support roller 53 which supports the outlet end 12 of brush cage 24. As FIGS. 9 and 10 show, the stationary ring gear 59 is tiltably mounted on support frame 13 by means of brackets 92 on support frame 13 which receive pivot pins 91 on ring gear 59 to accommodate the adjustable movement of the support roller 53.

Referring to FIGS. 4, 5, 8, 10 and 14, means are provided for introducing products from a source, such as a compartment 100 on support frame 13, into chamber 26 for processing and for subsequently removing them from the chamber after processing. Such means comprise a stationary container or tube 102 which extends through chamber 26 and movable nut transport means in the form of a rotatable auger 104. Auger 104 is located within tube 102 and auger shaft 114 is rotatably supported by bearings 116 (only one visible in FIG. 14) at the ends of tube 102. Auger 104 is rotatably driven by an auger drive motor 105 shown schematically in FIG. 8 but could be driven from power take-off means (not shown) connected to drive motor 73 shown in FIGS. 2 and 10.

The tube 102, which is closed at both ends, extends through chamber 26 and projects from each end thereof. Tube 102 has four openings (proceeding from the high end 11 to the low end 12 of chamber 26), namely: a top product supply opening 106 for receiving unhulled nuts from compartment 100; a bottom feed opening 108 for feeding unhulled nuts into chamber 26 as auger 104 rotates; a top product-recovery opening 110 for receiving hulled nuts falling through chamber 26 (see FIG. 5); and a bottom discharge opening 112 through which hulled nuts are expelled from the tube exteriorly of chamber 26.

Referring to FIGS. 4, 5, 8 and 14, it is seen that recovery opening 110 is provided with a hulled nut collection pan 118 along its lower edge which is rigidly secured as by welding to tube 102. Recovery opening 110 is also provided along its upper edge with an adjustably positionable deflection member or door 120 which is connected to tube 102 by a door hinge 122. Door 120 is positioned prior to operation of the apparatus 10 to choose the size of the gap between pan 118 and door 120 which is best suited to catch the falling hulled nuts (see FIG. 5). An upright nut catcher 124 is fixedly mounted on tube 102 at the end of opening 110 to deflect any unhulled air-borne nuts in the 1:30 to 11 o'clock sector which have reached the discharge end of chamber 26 into opening 110.

Means are provided for controlling hull removal in chamber 26 during processing of the nuts. Referring to FIGS. 6, 11, 12, 12A, 12B and 13, such means comprise a plurality of guards, cover members or fenders 200 associated with, but spaced from, the roller brushes 23 so as to enable each nut to make contact only with the abrasive means or bristles 42 on a limited portion of each roller 23. Each fender 200 takes the form of a rigid elongate member, preferably fabricated of sheet metal, having a generally curved cross-sectional configuration (FIGS. 5, 6 and 11) and which extends the entire length of the roller brushes 23 with which it is associated. Fender 200 overlies, but is spaced from, the incoming quadrant Q1 of the bristles 42 of its associated brush, as FIG. 6 shows.

Figure 13:
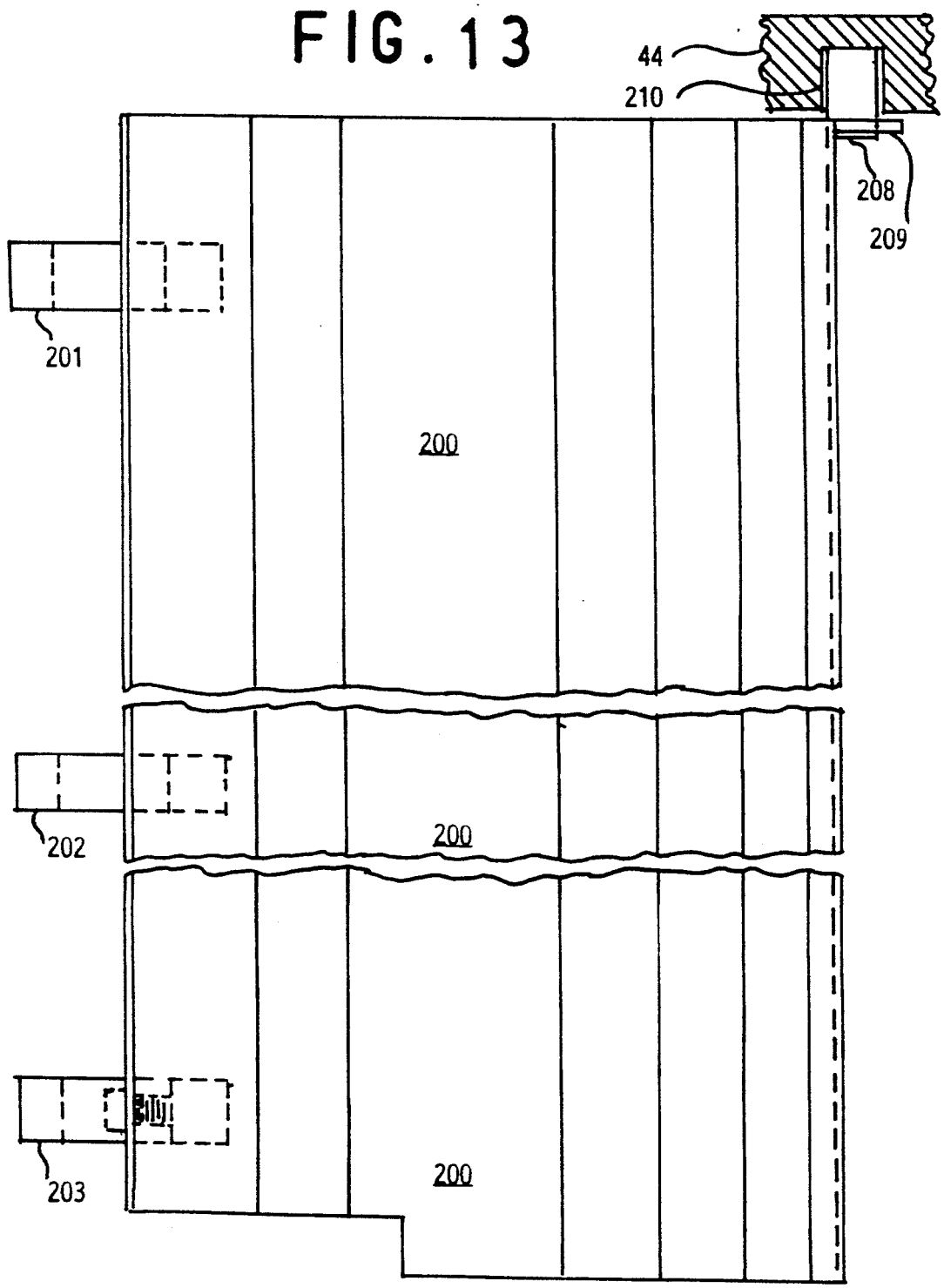
FIG. 13 is a plan view of the fender shown in FIG. 11.
Figure 14:
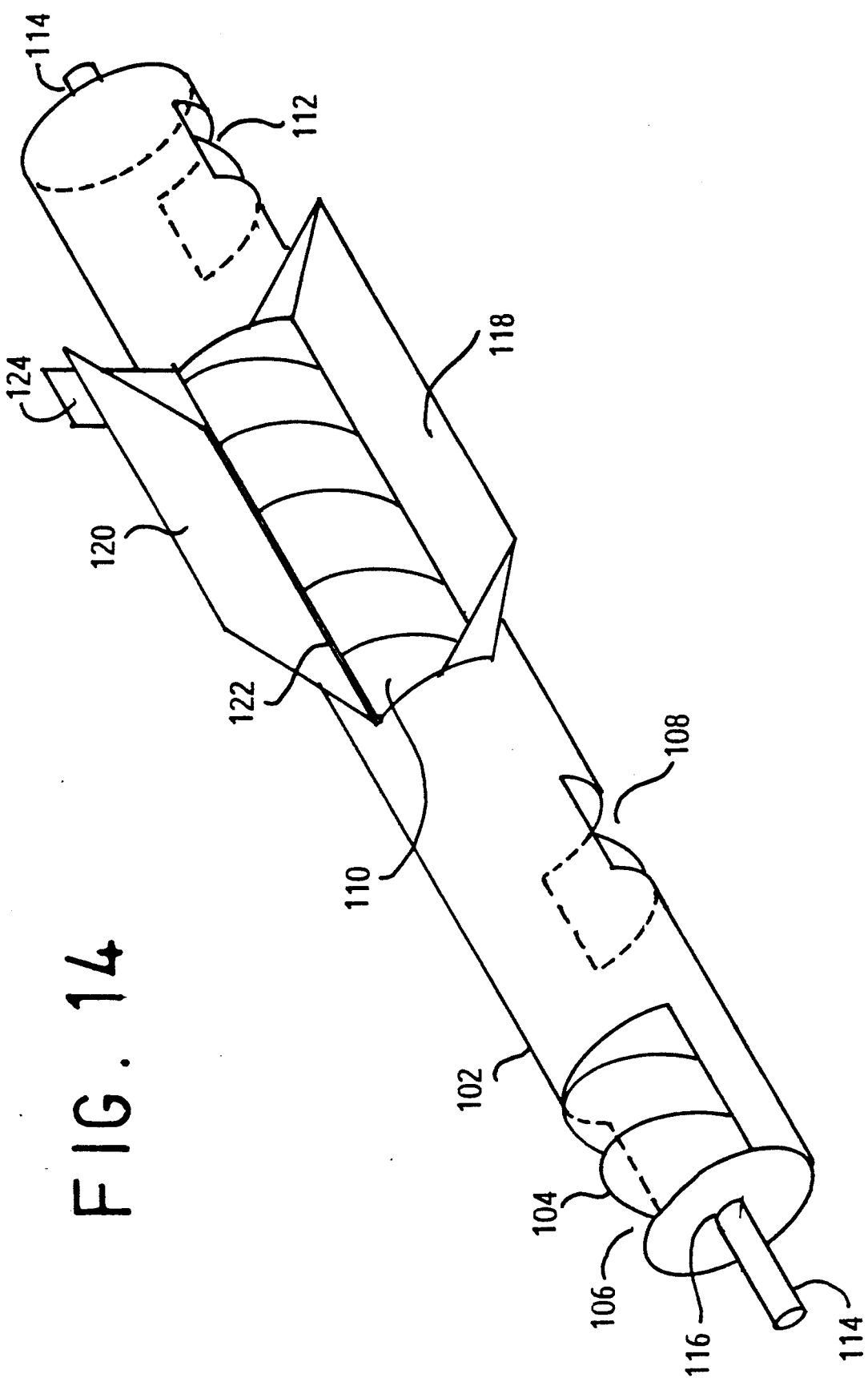
FIG. 14 is a perspective view of the tube and auger shown in FIGS. 4, 5 and 8.

Means are provided to mount the fenders 200 on roller cage 24. Referring to FIGS. 11 and 13, each fender 200 has three collars 201, 202 and 203 welded to one edge thereof in spaced-apart relationship to each other (see weld 206 in FIG. 11). Collar 203 is a split collar tightenable by a screw 205 in hole 204 but collars 201 and 202 are not split. The holes 207 in the three collars accommodate a support rod 212, shown in FIGS. 12, 12A and 12B, which is fabricated of a tube 214 having cylindrical rods 216 welded (as at 218) in the opposite ends thereof. Support rod 212 extends through the collars 201, 202 and 203 of fender 200 and is secured in place by tightening split collar 203. When in place on cage 24, the rods 216 are inserted in holes 220 in the brush support rings 44 and 47 of brush cage 24 (FIG. 12).

As FIG. 13 shows, each fender 200 also has a cylindrical pin 208 mounted by means of a bracket 209 to one corner thereof which, when fender 200 is installed in cage 24, extends into a pin hole 210 in brush support ring 44. As FIGS. 12A and 12B show, the rods 216 are eccentric relative to tube 214. Therefore, the radial position of support rod 212 in the collars 201, 202 and 203 determines the distance that fender 200 is spaced from its associated roller brush 23. This means for adjusting the position or spacing of fender 200 enables control of the abrading of the hull on the nuts being processed.

The apparatus 10 may include a rinse water system (not shown here but described in detail in my U.S. Pat. No. 5,106,641) in chamber 26 to supply water under pressure from a source (not shown) to flush debris and peelings outwardly from the brushes 23 toward housing 19 and to rinse the brush housing 19 after the product has been processed. However, no water is used while the product is being processed or while the product is in the chamber 26.

OPERATION

In operation, referring to FIGS. 4, 5, 6, 8 and 14, motor 73 is energized to effect rotation of brush cage 24 counter-clockwise in the direction of arrow A (FIGS. 5 and 6) and to effect rotation of each of the brushes 23 clockwise in the direction of arrow B (FIG. 5). Auger motor 105 is energized to effect rotation of auger 104 in the direction appropriate to advance a product through the tube 102. A product to be hulled (i.e., processed), such as pistachio nuts N, is introduced from compartment 100 through supply opening 106 into tube 102 and is advanced therethrough to bottom feed opening 108 from whence it falls into chamber 26 of cage 24. Taking into account the size, shape, nature, texture and weight of the product to be processed (compare, for example, nuts, kernels of corn), the operator of apparatus 10 controls, regulates or sets the rotational speed of brush cage 24 and controls the rate of feed of product into chamber 26 so that in so far as possible only one layer of product (FIGS. 4 and 5) is exposed to the rotating brushes 23. Each nut falls between the bristles 42 in the outgoing quadrant Q2 of one roller brush 23 and the outer side of a fender 200 overlying the incoming quadrant Q1 of an adjacent roller brush 23 (see FIG. 6). The trapped nut is hulled by the brush bristles continually moving through the outgoing quadrant Q2 and is also prevented from dropping downward by such action of the bristles and also by the centrifugal force of drum rotation. Individual nuts are carried upward by the rotation of brush cage 24 as they are being hulled. Each piece of product in contact with the brushes 23 is rotated, tumbled and abraded by the bristles 42 of the brush 23 with which the piece is in contact. The aforedescribed process is continued for the length of time necessary to fully clean and peel a particular product. The number, density, length, shape, tangential disposition and abrasive character of the bristles 42 are such that the bristles sweep across the product and these characteristics can be selected and combined to suit products of particular size, shape and texture. Each nut trapped between a fender 200 and the bristles in an outgoing quadrant Q2 is efficiently hulled and the hull waste is flung outwardly (and not inwardly) of chamber 26.

It is a characteristic of a hulled pistachio nut that it is no longer easily engaged by the roller bristles and it tends to fall downwardly through chamber 26 and through the gap between collection pan 118 and adjustable door 120 through recovery opening 110 into tube 102 which now serves as a collection container. As FIG. 5 shows, the hulled nuts fall under the force of gravity at a location near the low end of chamber 26 and at a point lower in orbit than Unhulled nuts (i.e., approximately in the 3 o'clock to 12 o'clock sector of the orbit). Since product recovery opening 110, pan 118 and door 120 are located in this sector, the hulled nuts fall back into tube 102. Auger 104 then expels the hulled nuts through discharge opening 112 of tube 102 for final disposition. However, unhulled nuts still in chamber 26 continue to be processed until they are hulled and fall into recovery opening 110. More specifically, unhulled nuts are released at about the 1 o'clock position and are air-borne to about the 11 o'clock position whereat they re-engage the rollers and continue to be processed until they are hulled an perform as above-described. The deflector member or door 120 is adjustably positionable from about the 12 o'clock position and the 2:30 o'clock position so as to enable the hulled nuts to enter opening 110 directly or to fall onto pan 118, but to prevent unhulled, air-borne nuts from entering the opening 110.

In so far as can be determined from tests and observation, the difference in release position between hulled and unhulled nuts depends on the following factors. When the hull is removed from a nut, the nut surface is very slick and smooth. Therefore, the brush or roller cannot "hang on" to it and keep it trapped in the V-shaped space between the outside of a fender 200 and the abrasive means in the outgoing quadrant Q2 of an adjacent roller 23. This characteristic is exhibited as true for pistachio nuts and almonds and is expected to occur with tomatoes and other fruits and vegetables.

Regarding the function of nut catcher 124, it operates to catch any unhulled nuts which reach the discharge end of chamber 26 and to direct them into opening 110 from whence they are discharged by auger 104, along with the hulled nuts, through discharge opening 112.

The chance of unhulled nuts reaching the end of chamber 26 is very low or non-existent, provided rollers of the correct size, shape and abrading characteristics are chosen, further provided that the chamber 26 is not over-loaded. Thus, nut catcher 124 serves primarily a precautionary function to ensure that all product exits from the chamber 26.

It is very important that the apparatus be operated at the correct speed so that the product is air-borne between the 1 o'clock and 11 o'clock position because this is the only way that hulling and peeling quality and uniformity can be controlled for specific products.

It is apparent from all of the foregoing that the fenders 200 hereinbefore described can be used in apparatus which does not employ the tube 102 and auger 104 disclosed herein, such as the apparatus in my U.S. Pat. No. 5,106,641 or similar apparatus. Conversely, apparatus employing the tube 102 and auger 104 disclosed herein can be operated without the fenders 200 disclosed herein.

I claim:

1. Apparatus for removing the outer covering of products, such as fruits, vegetables or nuts, without using water comprising:

a plurality of rotatable rollers arranged in radially spaced-apart relationship about an axis so as to define a rotatable roller cage having a generally cylindrical, sloped, product-processing chamber having a high end and a low end;

abrading means on the peripheral surface of each of said rollers, that portion of said abrading means confronting said chamber as a roller rotates moving arcuately through a first quadrant toward the axis of said chamber and then through a second quadrant away from the axis of said chamber;

means to rotate said roller cage about said axis in one direction and to rotate each roller in a direction opposite to said one direction, taking into account the size and weight of said products and the rate at which said products are fed into said chamber, to effect distribution of substantially a single layer of said products along said rollers, to effect advancement of said products from said high end toward said low end of said chamber, and to effect removal of said outer covering of said products in contact with said abrading means of said rollers;

means to introduce said products into said chamber near said high end for processing;

container means in said chamber having a product-recovery opening in the top thereof near said low end of said chamber to receive products from which said outer covering has been removed and which are falling toward the bottom of said chamber;

and means to expel said products from which said outer covering has been removed from said container exteriorly of said chamber.

2. Apparatus according to claim 1 wherein said container means comprises a tube and said means to expel said product comprises rotatable auger means in said tube.

3. Apparatus according to claim 2 wherein said tube extends through and projects from opposite ends of said chamber and, in addition to said product recovery opening, further comprises a supply opening exteriorly of said chamber through which products are supplied to said tube, a feed opening through which products are introduced into said chamber, and a discharge opening exteriorly of said chamber through which products are expelled from said tube.

4. Apparatus according to claim 1 wherein said cage, when viewed from one end, is perceived as rotating counterclockwise and each roller is perceived as rotating clockwise, and said hulled nuts tend to fall downwardly when reaching the sector between approximately between the 3 o'clock and 1:30 o'clock positions, and wherein said product-recovery opening in said container is aimed to receive the falling nuts.

5. Apparatus according to claim 4 wherein said container is provided with a collection pan member extending outwardly along the lower edge of said product-recovery opening to catch and direct falling hulled nuts into said product-recovery opening.

6. Apparatus according to claim 5 wherein said container is further provided with a deflection member extending outwardly along the upper edge of said product-recovery opening to prevent unhulled nuts falling from above said 1:30 o'clock position into said product recovery opening.

7. Apparatus according to claim 6 wherein said deflection member is adjustably positionable relative to said collection pan.

8. Apparatus for removing the outer covering of products, such as fruits, vegetables or nuts, without using water comprising:
a plurality of rotatable rollers arranged in radially spaced-apart relationship about an axis so as to define a rotatable roller cage having a generally cylindrical, sloped, product-processing chamber having a high end and a low end;
abrading means on the peripheral surface of each of said rollers, that portion of said abrading means confronting said chamber as a roller rotates moving arcuately through a first quadrant toward the axis of said chamber and then through a second quadrant away from the axis of said chamber;
means to rotate said roller cage about said axis in one direction and to rotate each roller in a direction opposite to said one direction, taking into account the size and weight of said products and the rate at which said products are fed into said chamber, to effect distribution of substantially a single layer of said products along said rollers, to effect advancement of said products from said high end toward said low end of said chamber, and to effect removal of said outer covering of said products in contact with said abrading means of said rollers;
and guard means in said chamber and associated with said rollers to enable products to make contact with only that portion of said abrading means moving arcuately through said second quadrant.

9. Apparatus according to claim 8 wherein said guard means comprises a plurality of fenders, each fender being disposed adjacent that portion of said abrading means on an associated roller which is moving arcuately through said first quadrant so that, during operation of the apparatus, the products are able to make contact only with that portion of said abrading means on said associated roller which is moving arcuately through said second quadrant.

10. Apparatus according to claim 9 wherein each piece of product is forced by said abrading means of one roller moving arcuately through said second quadrant against a fender disposed adjacent another roller.

11. Apparatus according to claim 10 including means to adjust the position of said fender relative to said abrading means in said second quadrant of said one roller to control the force exerted by said abrading means on a piece of product entrapped between said fender and said one roller.

12. Apparatus for removing the outer covering of products, such as fruits, vegetables or nuts, without using water comprising:
a plurality of rotatable rollers arranged in radially spaced-apart relationship about an axis so as to define a rotatable roller cage having a generally cylindrical, sloped, product-processing chamber having a high end and a low end;
abrading means on the peripheral surface of each of said rollers, that portion of said abrading means confronting said chamber as a roller rotates moving arcuately through a first quadrant toward the axis of said chamber and then through a second quadrant away from the axis of said chamber;
means to rotate said roller cage about said axis in one direction and to rotate each roller in a direction opposite to said one direction, taking into account the size and weight of said products and the rate at which said products are fed into said chamber, to effect distribution of substantially a single layer of said products along said rollers, to effect advancement of said products from said high end toward said low end of said chamber, and to effect removal of said outer covering of said products in contact with said abrading means of said rollers;
guard means in said chamber and associated with said rollers to enable products to make contact with only that portion of said abrading means moving arcuately through said second quadrant,
means to introduce said products into said chamber near said high end for processing;
container means in said chamber having a product-recovery opening in the top thereof near said low end of said chamber to receive products from which said outer covering has been removed and which are falling toward the bottom of said chamber;
and means to expel said products from which said outer covering has been removed from said container exteriorly of said chamber.

13. Apparatus according to claim 12 wherein said container means comprises a tube and said means to expel said product comprises rotatable auger means in said tube.

14. Apparatus according to claim 13 wherein said tube extends through and projects from opposite ends of said chamber and, in addition to said product recovery opening, further comprises a supply opening exteriorly of said chamber through which products are supplied to said tube, a feed opening through which products are introduced into said chamber, and a discharge opening exteriorly of said chamber through which products are expelled from said tube.

15. Apparatus according to claim 14 wherein said cage, when viewed from one end, is perceived as rotating counterclockwise and each roller is perceived as rotating clockwise, and said hulled nuts tend to fall downwardly when reaching the sector approximately between the 3 o'clock and 1:30 o'clock positions, and wherein said product-recovery opening in said container is aimed to receive the falling nuts.

16. Apparatus according to claim 15 wherein said container is provided with a collection pan member extending outwardly along the lower edge of said product-recovery opening to catch and direct falling hulled nuts into said product-recovery opening.

17. Apparatus according to claim 16 wherein said container is further provided with a deflection member extending outwardly along the upper edge of said product-recovery opening to prevent unhulled nuts falling from above said 1:30 o'clock position into said product recovery opening.

18. Apparatus according to claim 17 wherein said deflection member is adjustably positionable relative to said collection pan.

19. Apparatus according to claim 12 wherein said guard means comprises a plurality of fenders, each fender being disposed adjacent that portion of said abrading means on an associated roller which is moving arcuately through said first quadrant so that, during operation of the apparatus, the products are able to make contact only with that portion of said abrading means on said associated roller which is moving arcuately through said second quadrant.

20. Apparatus according to claim 19 wherein each piece of product is forced by said abrading means of one roller moving arcuately through said second quadrant against a fender disposed adjacent another roller.

21. Apparatus according to claim 20 including means to adjust the position of said fender relative to said abrading means in said second quadrant of said one roller to control the force exerted by said abrading means on a piece of product entrapped between said fender and said one roller.

* * * * *